July 24, 1956
R. P. A. BOCCHINO
2,755,592
ARTIFICIAL BUOYANT DECOY FISH
Filed Feb. 12, 1954
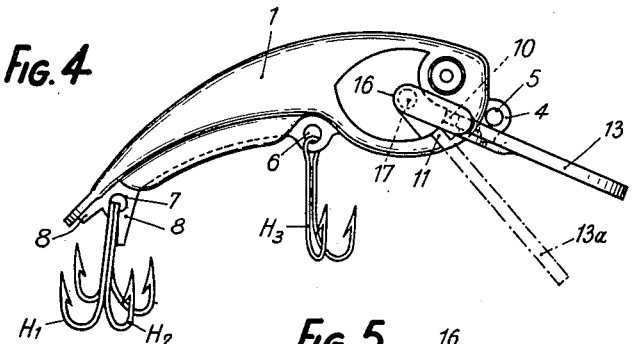
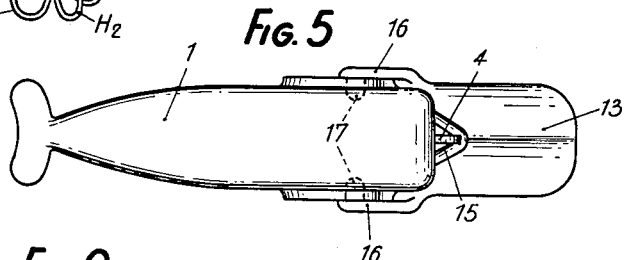
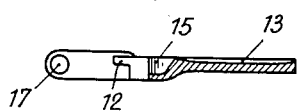
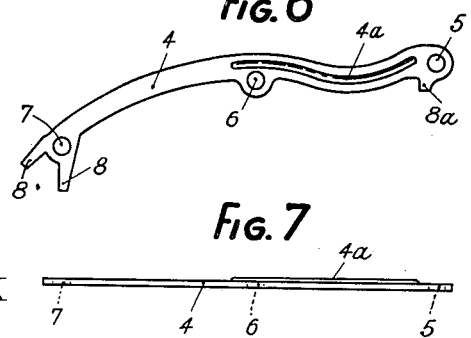
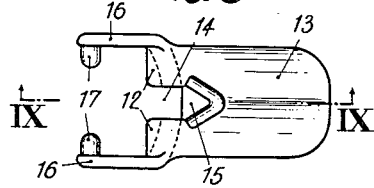
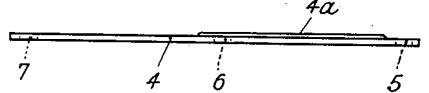
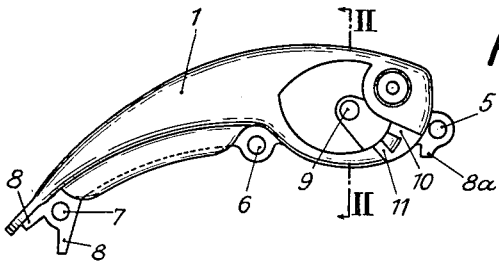
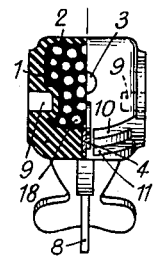
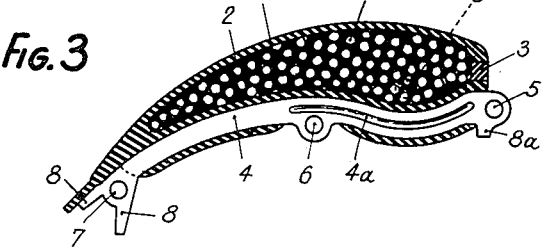
Inventor:
Roger Paul Alexandre
Bocchino
by: J. Orlatter Ayry
Attorney

United States Patent Office 2,755,592
Patented July 24, 1956

2,755,592

ARTIFICIAL BUOYANT DECOY FISH

Roger Paul Alexandre Bocchino, Paris, France

Application February 12, 1954, Serial No. 409,977

Claims priority, application France February 17, 1953

3 Claims. (Cl. 43—42.22)

This invention relates to artificial buoyant decoy fish provided with an adjustable fin or vane whereby the depth and movement of the fish can be varied as desired by the user.

The object of the invention is to provide an artificial buoyant decoy fish of the aforesaid type which is extremely simple in design and adjustment, ensures positive locking of the vane, and is of a sturdy construction.

According to one feature of the invention, the movable vane is mounted on the fish by means of a pivoting connection between said vane and said fish on an axis transverse to the plane of symmetry of the fish.

According to another feature of the invention, at least the fore part of the fish is made of a yieldable and resilient material and the locking means for locking said vane in any selected angular position on said fish consist of a plurality of grooves provided in said fore part of said fish radially of said pivoting axis of the vane, and of a complementary tongue provided on said vane and adapted to be engaged selectively into said grooves, taking advantage of the yieldable and resilient character of the material of said fore part of said fish.

Other features and advantages of the invention will appear in the course of the following description.

The invention may be more clearly understood by reference to the accompanying drawings in which:

Fig. 1 shows in side elevational view an artificial decoy fish for use in fishing embodying the invention, the removable vane being omitted for the sake of clarity, Fig. 2 on the right-hand half is a front view of Fig. 1 whereas the left-hand half thereof is a section on line II—II of Fig. 1, Fig. 3 is a longitudinal section of the fish on the plane of symmetry, Fig. 4 is a view similar to that of Fig. 1 with the addition of the vane and hooks, Fig. 5 is a top view of Fig. 4, Figs. 6 and 7 are respectively elevational and top views of the rigid frame member adapted to support the hooks, Fig. 8 is a top view of the removable vane, and Fig. 9 is a section on line IX—IX of Fig. 8.

The artificial decoy fish illustrated in the accompanying drawings comprises a body 1 made of a resilient material, such as rubber or any derivate or substitute thereof, provided at its upper portion with a pocket or chamber 2 symmetrically arranged and obturated by a plug 3, said chamber being filled with a body 18 of rubber with air-tight cells.

While the body 1 is being molded, a rigid frame member 4 (Figs. 6 and 7) is embedded in the lower portion thereof. Said frame member is formed with a stiffening rib 4a and two end apertures 5, 7 and an intermediate aperture 6 which protrudes out of the body 1. At the end of the frame member adjacent to the rib 4a is a lug 8a and at the opposite end portion thereof are two further lugs 8. The aperture 5 is adapted to receive a leader which insures the desired mobility, the lug 8a preventing same from looping; the two apertures 6 and 7 are adapted respectively to receive a detachable twin hook $H_3$ and two detachable twin hooks $H_1$, $H_2$ oppositely arranged (Fig. 4) either directly in the case of special hooks, or by means of split rings or any other suitable equivalent means. The lugs 8 arranged on either side of the twin hooks $H_1$, $H_2$ are so arranged and angularly spaced from each other that they prevent looping when the line is being cast and entangling of the shanks of the two hooks.

The fore part forming the head of the fish has, on one hand, two cylindrical recesses 9 having a common axis at right angles to the plane of symmetry of the fish, and on the other hand two sets of symmetrical semi-notches 10, 11 each having a plane of symmetry containing the axis of the recesses 9.

These semi-notches are adapted to receive the edges 12 of a vane 13 possibly made of plastic material and having a notch 14 and a depression 15; this vane is formed with two extending arms or strap members 16 each having a pin 17. Both pins 17 are located on the same axis and are adapted, owing to the yielding character of the fish head, to be engaged into the recesses 9 in which they may be rotated.

The distance between the edges 12 and the pins 17 is such that the vane may be applied through said edges against the bottom of the notches 10 or 11 with a pressure high enough for insuring the stability of the vane in each notch.

When the vane 13 is in the position indicated in full lines in Fig. 4, namely for swimming at a moderate depth, the fore end portion of the frame member 4 is housed within the depression 15 of the vane.

In the other position indicated in dotted line 13a in Fig. 4, conditions are secured for swimming at a greater depth.

The vane 13 may be moved from one position to the other with the pins 17 kept engaged within their recesses 9, taking advantage of the yielding properties of the fish head.

The user thus has at his dispostal an artificial buoyant decoy fish adapted to travel along a path the depth of which may be readily altered. The hooks may also be replaced with great ease.

Though in the embodiment described and shown, only two sets of semi-notches 10, 11 are provided for positioning the vane 13, any other number of such notches could be adopted without departing from the scope of this invention.

What I claim is:

1. An artificial decoy fish for use in fishing comprising a body at least the fore part of which is made of a buoyant yieldable and resilient material, a fin formed with two strap members provided with two coaxial pin-like projections oriented inwardly toward each other and adapted to engage corresponding recesses in said fore part and located on an axis transverse to said body so as to provide for pivotal adjusting movement of said fin on said body about said transverse axis, and locking means for locking said fin in a plurality of selected angular positions on said body, said locking means having at least one element formed on said fin and at least one complementary element formed on said fore part of said body, whereby said fin may be resiliently locked in a selected angular position and manually angularly shifted from one position to another by a deformation of said yieldable material of said fore part of said body against the resiliency thereof.

2. An artificial buoyant decoy fish as defined in claim 1, wherein one of said locking elements consists of a plurality of grooves in said fore part of said body and the other consists of a tongue on said fin adapted to engage any of said grooves.

3. An artificial decoy fish for use in fishing comprising a body at least the fore part of which is made of a buoyant yieldable and resilient material, a fin formed with two strap members provided with two coaxial pin-like projections oriented toward each other and adapted to engage corresponding recesses in said fore part and located on an axis transverse to said body so as to provide for pivotal adjusting movement of said fin on said body about said transverse axis, and locking means for locking said fin in a plurality of selected angular positions on said body, said locking means comprising a plurality of grooves formed in said fore part of said body and positioned radially of said transverse axis, and a complementary tongue provided on said fin adapted selectively to engage said grooves taking advantage of the yieldable and resilient character of the material of said fore part of said body for allowing said tongue to be shifted from one groove to another for varying the orientation of the fin on the body and to be resiliently retained in any selected one of said grooves for locking the fin in selected angular position.

References Cited in the file of this patent

UNITED STATES PATENTS

| | | |
|---|---|---|
| 1,233,507 | Reynolds | July 17, 1917 |
| 1,242,556 | Jay | Oct. 9, 1917 |
| 2,290,433 | Jeffers | July 21, 1942 |
| 2,561,750 | Overton | July 24, 1951 |
| 2,703,946 | Davis | Mar. 15, 1955 |